(12) United States Patent
Kim et al.

(10) Patent No.: US 10,927,024 B2
(45) Date of Patent: Feb. 23, 2021

(54) WATER TREATMENT APPARATUS FOR REMOVING NITROGEN CONTAINED IN RAW WATER AND WATER TREATMENT METHOD USING THE SAME

(71) Applicant: DOOSAN HEAVY INDUSTRIES & CONSTRUCTION CO., LTD., Changwon-si (KR)

(72) Inventors: Seong Ju Kim, Suwon-si (KR); Su Nam You, Yongin-si (KR); Yang Oh Jin, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/557,989

(22) Filed: Aug. 30, 2019

(65) Prior Publication Data
US 2020/0079669 A1    Mar. 12, 2020

(30) Foreign Application Priority Data

Sep. 7, 2018 (KR) .................. 10-2018-0106813
Sep. 7, 2018 (KR) .................. 10-2018-0106814

(51) Int. Cl.
*C02F 3/30* (2006.01)
*C02F 3/12* (2006.01)
(Continued)

(52) U.S. Cl.
CPC .............. *C02F 3/307* (2013.01); *C02F 3/121* (2013.01); *C02F 3/1273* (2013.01); *C02F 3/305* (2013.01);
(Continued)

(58) Field of Classification Search
CPC .......... C02F 3/307; C02F 3/1273; C02F 3/34; C02F 3/20; C02F 2209/22; C02F 3/121;
(Continued)

(56) References Cited

U.S. PATENT DOCUMENTS 7,001,519 B2 * 2/2006 Linden .................. A01K 63/04
119/227
7,722,768 B2 * 5/2010 Abma .................. C02F 3/1215
210/605
(Continued)

FOREIGN PATENT DOCUMENTS

CA     2852492 A1 * 11/2014
JP     4849481 B      1/2012
(Continued)

OTHER PUBLICATIONS

Korea Waterworks Association, Standards for sewerage facilities. 2011, pp. 525-527, 530.
(Continued)

*Primary Examiner* — Fred Prince
(74) *Attorney, Agent, or Firm* — Invenstone Patent, LLC

(57) ABSTRACT

A water treatment apparatus for removing nitrogen in raw water and a water treatment method using the same are provided. The water treatment apparatus includes a denitrification reactor configured to remove nitrogen contained in raw water supplied thereto, a phosphorus treatment tank configured to remove phosphorus (P) contained in the raw water supplied from the denitrification reactor, an anammox reactor configured to remove nitrogen contained in the raw water supplied from the phosphorus treatment tank through an anammox reaction, a partial nitritation tank configured to convert ammonium ions ($NH_4^+$) remaining untreated in the anammox reaction into nitrite ions ($NO_2^-$), and a sedimentation tank configured to cause settling of suspended matter contained in the raw water supplied from the partial nitri-
(Continued)

tation tank so that sludge forms and discharge the raw water through a raw water discharge pipe.

19 Claims, 14 Drawing Sheets

(51) Int. Cl.
| | |
|---|---|
| *C02F 3/34* | (2006.01) |
| *C02F 3/20* | (2006.01) |
| *C02F 3/00* | (2006.01) |
| *C02F 9/00* | (2006.01) |
| *C02F 1/52* | (2006.01) |
| *C02F 1/44* | (2006.01) |
| *C02F 1/00* | (2006.01) |
| *C02F 101/10* | (2006.01) |
| *C02F 101/16* | (2006.01) |
| *C02F 101/38* | (2006.01) |

(52) U.S. Cl.
CPC ............... *C02F 3/308* (2013.01); *C02F 3/34* (2013.01); *C02F 3/341* (2013.01); *C02F 1/00* (2013.01); *C02F 1/44* (2013.01); *C02F 1/5281* (2013.01); *C02F 3/006* (2013.01); *C02F 3/20* (2013.01); *C02F 3/302* (2013.01); *C02F 9/00* (2013.01); *C02F 2001/007* (2013.01); *C02F 2101/105* (2013.01); *C02F 2101/16* (2013.01); *C02F 2101/163* (2013.01); *C02F 2101/166* (2013.01); *C02F 2101/38* (2013.01); *C02F 2209/006* (2013.01); *C02F 2209/14* (2013.01); *C02F 2209/15* (2013.01); *C02F 2209/22* (2013.01); *C02F 2209/40* (2013.01); *C02F 2301/046* (2013.01); *C02F 2301/08* (2013.01); *Y02W 10/10* (2015.05)

(58) Field of Classification Search
CPC .............. C02F 2209/15; C02F 2209/14; C02F 2209/006; C02F 2209/40; C02F 3/006; C02F 2301/046; C02F 2001/007; C02F 3/341; C02F 3/308; C02F 3/305; C02F 9/00; C02F 1/5281; C02F 1/44; C02F 3/302; C02F 2101/105; C02F 2101/16; C02F 2101/163; C02F 2101/166; C02F 2101/38; C02F 1/00; C02F 2301/08
USPC ........ 210/605, 614, 621, 622, 903, 906, 259
See application file for complete search history.

(56) References Cited

U.S. PATENT DOCUMENTS

| | | | |
|---|---|---|---|
| 8,012,352 B1* | 9/2011 | Giraldo | C02F 3/302 |
| | | | 210/605 |
| 8,801,931 B2* | 8/2014 | Liu | C02F 3/1215 |
| | | | 210/603 |
| 2017/0217806 A1* | 8/2017 | Razavi-Shirazi | C02F 3/342 |
| 2018/0230033 A1* | 8/2018 | Cumbie | C02F 3/307 |

FOREIGN PATENT DOCUMENTS

| | | |
|---|---|---|
| JP | 2016-049512 A | 4/2016 |
| KR | 10-2011-0113480 A | 10/2011 |
| KR | 10-2015-0096647 A | 8/2015 |
| KR | 10-1692162 B1 | 1/2017 |
| KR | 10-2017-0085886 A | 7/2017 |
| KR | 10-2017-0132429 A | 12/2017 |

OTHER PUBLICATIONS

Wikipedia. Nitrification.
Wikipedia. Anammox.

* cited by examiner

WATER TREATMENT APPARATUS FOR REMOVING NITROGEN CONTAINED IN RAW WATER AND WATER TREATMENT METHOD USING THE SAME

CROSS REFERENCE TO RELATED APPLICATIONS

This application claims priority to Korean Patent Application Nos. 10-2018-0106813 and 10-2018-0106814, filed on Sep. 7, 2018, the disclosures of which are incorporated herein by reference in their entireties.

BACKGROUND

1. Field

Apparatuses and methods consistent with exemplary embodiments relate to a water treatment apparatus for removing nitrogen contained in raw water and a water treatment method using the same and, more particularly, to a water treatment apparatus capable of removing organic matter and phosphorus, removing nitrogen using an anammox process, and removing nitrogen compounds such as nitrate ions, nitrite ions, and ammonium ions which remain after the anammox process, and a water treatment method using the same.

2. Description of the Related Art

The causes of water pollution include organic matter and minerals such as nitrogen and phosphorus. Nitrogen is one of the nutrients causing eutrophication and red tide which promote a generation of harmful algae blooms and increase the chemical oxygen demand (COD) in water. Organic matter should be removed because it reduces an amount of dissolved oxygen (DO) in a water body.

As a method for treating wastewater containing such various contaminants, there is an approach of utilizing the metabolism of underwater microorganisms.

Typically, wastewater is treated by decomposing organic matter using aerobic microorganisms in a reactor. However, such a related art wastewater treatment method has a disadvantage of requiring high power consumption for operation of an air diffuser or blower to supply air into the reactor.

For example, an operation of blowers accounts for about 40% of a total power consumption of a sewage treatment plant where nitrogen in wastewater is generally removed by nitrification/denitrification (i.e., heterotrophic denitrification) processes (for example, MLE, A2O processes, etc.).

However, nitrification/denitrification for nitrogen removal has many problems: it is necessary to supply a large amount of air to a reactor to nitrify ammonia into nitrate; organic matter needs to be added to the reactor for denitrification; and a large amount of sludge is generated, resulting in an increase in sludge treatment cost.

To solve these problems, anaerobic ammonium oxidation (anammox) is proposed for nitrogen removal. Anammox removes nitrogen as nitrogen gas by reacting ammonia with nitrite to produce nitrogen gas. It is known as an economical process because it can reduce power consumption for ammonia oxidation, does not require addition of organic matter, and can reduce the amount of sludge generated.

In an ordinary sequencing batch reactor (SBR), an anammox process is performed in one reactor to remove nitrogen. However, the SBR has a disadvantage that an operation ratio of a reactor is inversely proportional to a discharge rate and a nitrogen removal rate due to its characteristics such as time divisional operations and nitrogen removal through nitrification and denitrification. Therefore, there is a limit in improving nitrogen removal efficiency with the SBR.

In addition, there is a problem that the efficiency of the anammox process is lowered when organic matter or phosphorus is not removed prior to the anammox process.

Therefore, it is necessary to improve nitrogen removal efficiency.

SUMMARY

Aspects of one or more exemplary embodiments provide a water treatment apparatus for preliminarily removing organic matter and phosphorus, then effectively removing nitrogen through an anammox process, and effectively removing nitrogen compounds such as nitrate ions, nitrite ions, and ammonium ions which remain after the anammox process, and a water treatment method using the same apparatus.

Additional aspects will be apparent in part in the description which follows and, in part, will become apparent from the description from the following description, or may be learned by practice of the exemplary embodiments.

According to an aspect of an exemplary embodiment, there is provided a water treatment apparatus including: a denitrification reactor configured to remove nitrogen contained in raw water supplied thereto; a phosphorus treatment tank configured to remove phosphorus (P) contained in the raw water supplied from the denitrification reactor; and an anammox reactor configured to remove nitrogen contained in the raw water supplied from the phosphorus treatment tank through an anammox reaction.

The water treatment apparatus may further include a partial nitritation tank configured to convert ammonium ions ($NH_4^+$) remaining unreacted in the anammox reaction into nitrite ions ($NO_2^-$), and a sedimentation tank configured to cause settling of suspended matter in the raw water supplied from the partial nitritation tank so that sludge forms and discharge the raw water through a raw water discharge pipe.

The denitrification reactor may include a membrane immersed in the raw water and a reciprocating device connected to the membrane to reciprocate the membrane.

The phosphorus treatment tank may remove phosphorus contained in the raw water by using magnesium ions.

The anammox reactor may accommodate anammox bacteria including any one or more species selected from a group consisting of *Candidatus kuenenia, Candidatus brocadia, Candidatus anammoxoglobus, Candidatus jettenia*, and *Candidatus scalindua*.

The partial nitritation tank may accommodate aerobic ammonium oxidizing bacteria (AOB) therein.

The water treatment apparatus may further include a first return pipe connected between the raw water discharge pipe and the denitrification reactor such that a portion of the raw water discharged from the sedimentation tank is returned to the denitrification reactor through the first return pipe to remove nitrate ions ($NO_3^-$).

The water treatment apparatus may further include a second return pipe connected between the raw water discharge pipe and the anammox reactor such that a portion of the raw water discharged from the sedimentation tank is returned to the anammox reactor through the second return pipe to remove nitrite ions ($NO_2^-$).

The water treatment apparatus may further include a third return pipe connected between the sedimentation tank and the partial nitritation tank such that a portion of sludge discharged from the sedimentation tank is transported to the partial nitritation tank through the third return pipe.

The water treatment apparatus may further include a suspended-solids contact reactor configured to remove suspended solids (SS) and soluble COD contained in the raw water, the suspended-solids contact reactor being located an upstream of the denitrification reactor.

The suspended-solids contact reactor may include a baffle configured to be spaced apart from an inner surface of a hopper by a predetermined distance and guide a flow of flocks contained in the raw water toward a lower end of the hopper; a guide plate located between the inner surface of the hopper and the baffle to divide the flow of the flocks to prevent the sludge from rising; and a folding plate located above an orifice tube to prevent the sludge from rising in the hopper.

The anammox reactor may include a chamber configured to be equipped with a raw water feed pipe through which the raw water is supplied and accommodate ammonia oxidizing bacteria (AOB) and anammox bacteria, a first controller configured to measure a concentration of a nitrogen compound contained in the raw water supplied to and stored in the chamber, and a second controller configured to control a feed flow rate of the raw water so that a concentration of ammonium ions ($NH_4^+$) contained in the raw water supplied to and stored in the chamber is maintained within a predetermined range.

The first controller may include a first measuring unit configured to measure the concentration of ammonium ions ($NH_4^+$), a second measuring unit configured to measure a concentration of nitrite ions ($NO_2^-$), and a third measuring unit configured to measure a concentration of nitrate ions ($NO_3^-$).

The first measuring unit may include a first calculator configured to calculate an amount of reduced ammonium ions ($NH_4^+$) by measuring a change in the concentration of the ammonium ions ($NH_4^+$) for a unit time, the second measuring unit may include a second calculator configured to calculate an amount of produced nitrite ions ($NO_2^-$) by measuring a change in the concentration of nitrite ions ($NO_2^-$) for the unit time, and the third measuring unit may include a third calculator configured to calculate an amount of produced nitrate ions ($NO_3^-$) by measuring a change in the concentration of nitrate ions ($NO_3^-$) for the unit time.

The second controller controls the feed flow rate of the raw water according to a value calculated by Expression 1, $$Q = \frac{[NO_{2gen}^-] + [NO_{3gen}^-]}{[NH_{4rem}^+]} \qquad \text{[Expression 1]}$$

wherein if the value is 0.7 or greater, the feed flow rate of the raw water is controlled such that the concentration of ammonium ions ($NH_4^+$) in the chamber is maintained within a range from 50 to 100 mg/L, and if the value is less than 0.7, the feed flow rate of the raw water is controlled such that the concentration of ammonium ions ($NH_4^+$) in the chamber is maintained within a range from 100 to 250 mg/L.

According to an aspect of another exemplary embodiment, there is provided a water treatment method using a water treatment apparatus, the method including: removing, by a denitrification reactor, nitrogen contained in raw water supplied; removing, by a phosphorus treatment tank, phosphorus (P) contained in the raw water supplied from the denitrification reactor; removing, by an anammox reactor, nitrogen contained in the raw water supplied from the phosphorus treatment tank through an anammox reaction; converting, by a partial nitritation tank, ammonium ions ($NH_4^+$) remaining unreacted in the anammox reaction into nitrite ions ($NO_2^-$); and settling, by a sedimentation tank, suspended matter contained in the raw water supplied from the partial nitritation tank to form sludge and discharging the raw water.

The water treatment method may further include returning a portion of the raw water discharged from the sedimentation tank to the denitrification reactor to remove nitrate ions ($NO_3^-$).

The water treatment method may further include returning a portion of the raw water discharged from the sedimentation tank to the anammox reactor to remove nitrite ions ($NO_2^-$).

The water treatment method may further include transporting a portion of the sludge discharged from the sedimentation tank to the partial nitritation tank.

The water treatment method may further include removing, by a suspended-solids contact reactor, suspended solids (SS) and soluble COD contained in the raw water prior to the removing nitrogen contained in raw water.

The According to one or more exemplary embodiments, the anammox process can be stably operated and the nitrogen removal efficiency can be improved.

Because densely dispersed suspended matter, COD, phosphorus, and the like contained in raw water are pre-removed at an upstream stage of the anammox reactor, the anammox process can be stably operated and thus the nitrogen removal effect can be improved.

Further, because the partial nitritation tank is provided downstream of the anammox reactor, unreacted ammonium ions ($NH_4^+$) remaining after the anammox reaction can be removed. Also, because a portion of the raw water having passed through the sedimentation tank is returned to the denitrification reactor and the anammox reactor, nitrate ions ($NO_3^-$) and nitrite ions ($NO_2^-$) can be removed.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
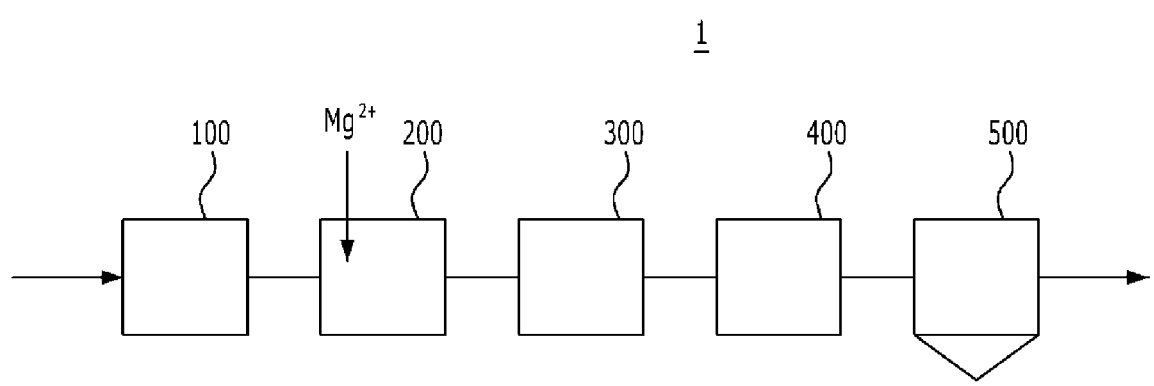
FIG. 1 is a schematic view of a water treatment apparatus according to an exemplary embodiment.

Various modifications may be made to the embodiments of the disclosure, and there may be various types of embodiments. Thus, specific embodiments will be illustrated in drawings, and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, the terms such as "comprises", "includes" and/or "have/has" should be construed as designating that there are such features, regions, integers, steps, operations, elements, components, and/or a combination thereof in the specification, not to exclude the presence or possibility of adding one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

Hereinbelow, exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a schematic view illustrating a water treatment apparatus 1 according to an exemplary embodiment. Referring to FIG. 1, the water treatment apparatus 1 may include a denitrification reactor 100 for primarily removing nitrogen contained in an incoming raw water through denitrification, a phosphorus treatment tank 200 located downstream of the denitrification reactor 100 and configured to remove phosphorus (P) contained in the raw water, an anammox reactor 300 located downstream of the phosphorus treatment tank 200 and configured to remove nitrogen contained in the raw water, a partial nitritation tank 400 located downstream of the anammox reactor 300 and configured to convert ammonium ions ($NH_4^+$) untreated in the anammox reactor 300 into nitrite ions ($NO_2^-$), and a sedimentation tank 500 located downstream of the partial nitritation tank 400 and configured to cause settling of suspended matter in the raw water supplied from the partial nitritation tank 400 so that sludge forms on a bottom of the sedimentation tank 500 and configured to discharge the raw water through a raw water discharge pipe. The exemplary embodiment has an effect of stably performing an anammox process and improving nitrogen removal efficiency.

For example, because densely dispersed suspended matter, COD, phosphorus, and the like contained in the raw water are pre-removed at an upstream stage of the anammox reactor, the anammox process can be stably operated, resulting in improvement in a nitrogen removal effect. In addition, because the partial nitritation tank 400 is additionally provided at a downstream stage of the anammox reactor 300, unreacted ammonium ions remaining after the anammox reaction can be removed. Further, because a portion of the raw water having passed through the partial nitritation tank 400 may be returned to the denitrification reactor 100 and the anammox reactor 300, nitrate ions and nitrite ions can be removed.

Figure 2:
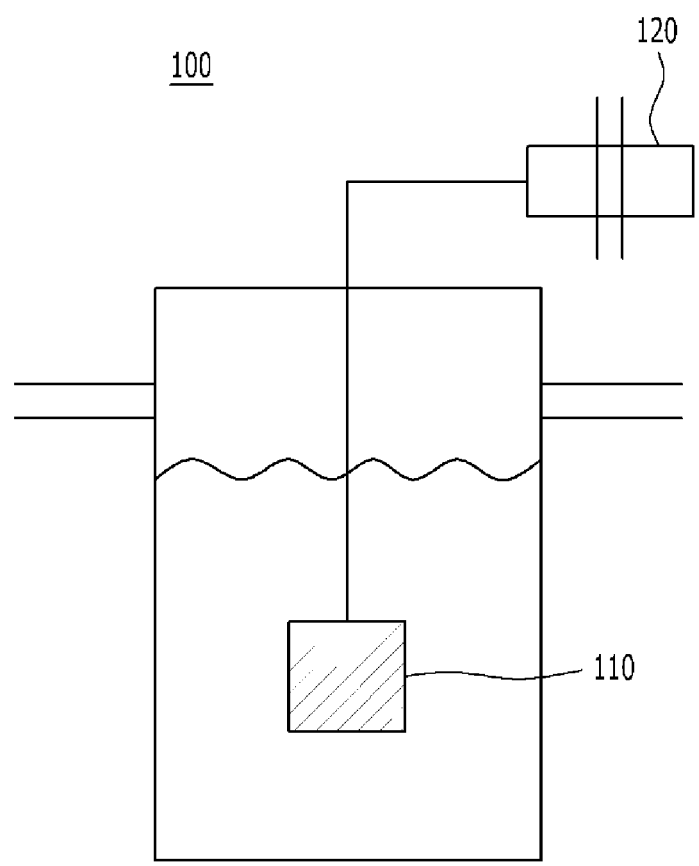
FIG. 2 is a schematic view of a denitrification reactor according to an exemplary embodiment.

FIG. 2 is a schematic view of a denitrification reactor 100 according to an exemplary embodiment. Referring to FIG. 2, the denitrification reactor 100 is an anoxic tank and includes a membrane 110 immersed in the raw water flowing into the denitrification reactor 100 and a reciprocating device 120 connected to the membrane 110 to reciprocate the membrane 110.

The membrane 110 is used as a physical barrier for perfect solid-liquid separation. The membrane 110 may be a low-pressure microfiltration (MF) membrane or an ultrafiltration (UF) membrane. The membrane 110 is mechanically connected with the reciprocating device 120.

Figure 3:
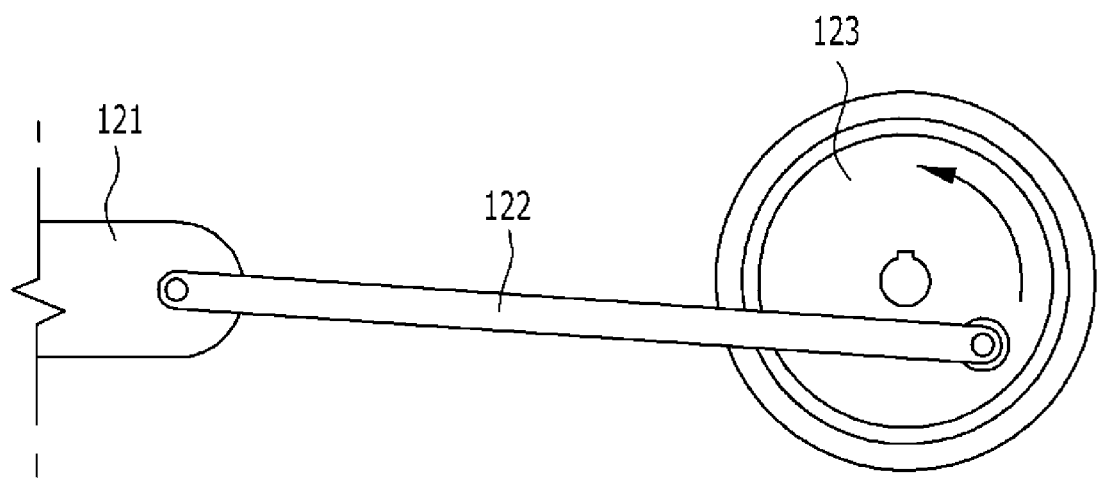
FIG. 3 is a schematic view of a reciprocating device according to an exemplary embodiment.
Figure 4:
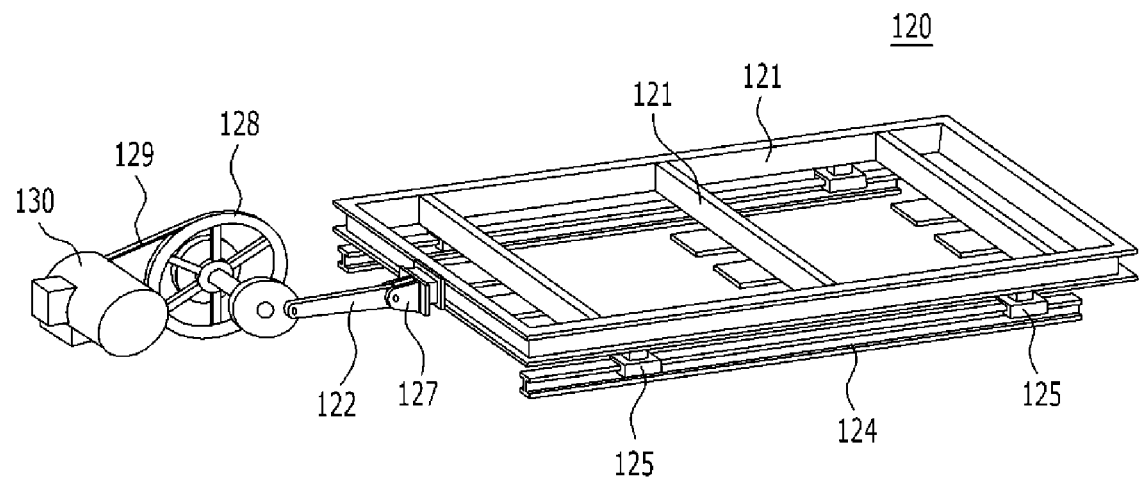
FIG. 4 is a detailed view of the reciprocating device.

FIGS. 3 and 4 illustrate the reciprocating device 120. The reciprocating device 120 is used to linearly reciprocate the membrane 110. The reciprocating device 120 is a mechanical device that transforms a rotary motion to a linear reciprocating motion.

Referring to FIGS. 3 and 4, the membrane 110 is connected with a sliding frame 121, and a rotor 123 is connected to the sliding frame 121 via a shaft 122. The reciprocating device 120 transforms the rotary motion of the rotor 123 to the linear reciprocating motion of the sliding frame 121. The frequency of reciprocating movements depends on the rotation speed of the rotor 123.

For example, the rotary motion of the rotor 123 is transformed to the linear reciprocating motion of the sliding frame 121 via the shaft 122 and a low-speed motor 130 that is connected to a pulley 128 via a belt 129. An impact load due to the reciprocating motion can be reduced by a shock absorber 127 provided between the sliding frame 121 and the shaft 122. The sliding frame 121 can be moved along rails 124 provided with a linear bearing 125 and a pillow block.

Referring to FIG. 1, the phosphorus treatment tank 200 is located downstream of the denitrification reactor 100 and removes phosphorus (P) contained in the raw water. In the phosphorous treatment tank 200, a variety of chemicals can be used. Preferably, magnesium ions are introduced into the raw water to remove the phosphorus contained in the raw water.

The anammox reactor 300 is located downstream of the phosphorus treatment tank 200. The anammox reactor 300 accommodates bacteria therein, thereby removing nitrogen through anammox reaction.

Anammox is an abbreviation for anaerobic ammonium oxidation (AMO). It refers to microorganism species that metabolize using nitrogen or refers to a process using the same. Anammox is a technology that reduces nitrogen compounds to nitrogen gas which is released to the air and has recently attention in a sewage treatment industry.

In the anammox process, ammonia oxidizing bacteria first oxidizes half of ammonium ions to produce nitrite ions ($NO_2^-$), as shown in Chemical Formula 1 below.

$$2NH_4^+ + 3O_2 \rightarrow 2NO_2^- + 4H^+ + 2H_2O \quad \text{[Chemical Formula 1]}$$

Next, anammox bacteria (also referred to as anammox microorganism) causes a reaction between ammonium ions and nitrite ions to generate nitrogen as shown in Chemical Formula 2 below. Thus, nitrogen compounds are removed as nitrogen gas. In this case, the ammonium ions and the nitrite ions react at a molar ratio of about 1:1.

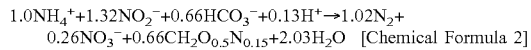
$$1.0NH_4^+ + 1.32NO_2^- + 0.66HCO_3^- + 0.13H^+ \rightarrow 1.02N_2 +$$
$$0.26NO_3^- + 0.66CH_2O_{0.5}N_{0.15} + 2.03H_2O \quad \text{[Chemical Formula 2]}$$

The anammox bacteria may be one or more species selected from the group consisting of *Candidatus kuenenia*, *Candidatus brocadia*, *Candidatus anammoxoglobus*, *Candidatus jettenia*, and *Candidatus scalindua*. The anammox bacteria are carried in a honeycomb-shaped medium and accommodated in the anammox reactor 300.

The partial nitritation tank 400 is located downstream of the anammox reactor 300 and accommodates aerobic ammonium oxidizing bacteria (AOB) therein. In the partial nitritation tank 400, the aerobic ammonium oxidizing bacteria may convert ammonium ions ($NH_4^+$) remaining in the anammox reactor 300 into nitrite ions ($NO_2^-$).

The ammonium oxidizing bacteria accommodated in the partial nitritation tank 400 may be *Nitrosomonas* or *Nitrosococcus*, and may be carried in a honeycomb-shaped medium.

The sedimentation tank 500 is located downstream end of the partial nitritation tank 400, allows suspended matter contained in the raw water supplied from the partial nitritation tank 400 to settle to produce sludge, and discharges the raw water to an outside through the raw water discharge pipe.

Figure 5:
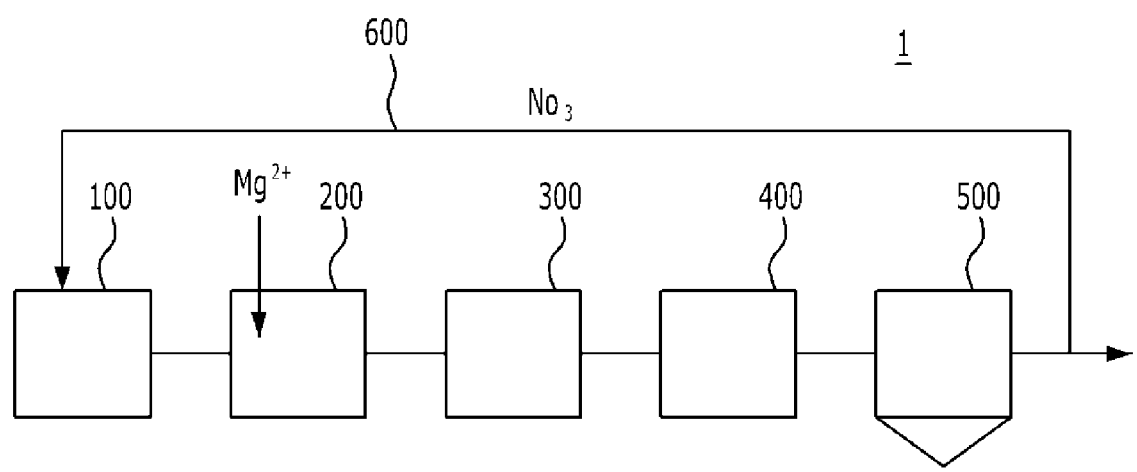
FIG. 5 is a schematic view of a water treatment apparatus according to an exemplary embodiment.

FIG. 5 is a schematic view illustrating a water treatment apparatus 1 according to an exemplary embodiment. Referring to FIG. 5, the water treatment apparatus 1 may further include a first return pipe 600 connected between the raw water discharge pipe and the denitrification reactor 100 such that a portion of the raw water discharged from the sedimentation tank 500 is returned to the denitrification reactor 100 through the first return pipe 600 and nitrate ions ($NO_3^-$) contained in the raw water discharged from the sedimentation tank 500 can be removed in the denitrification reactor 100.

The ammonium ions ($NH_4^+$) contained in the raw water discharged from the sedimentation tank 500 are almost completely removed through the anammox process and the partial nitritation process. However, because nitrate ions ($NO_3^-$) are generated as by-products of the anammox process, it is necessary to remove the nitrate ions ($NO_3^-$). The nitrate ions ($NO_3^-$) contained in the raw water can be removed by returning the raw water discharged from the sedimentation tank 500 to the denitrification reactor 100 through the first return pipe 600.

Figure 6:
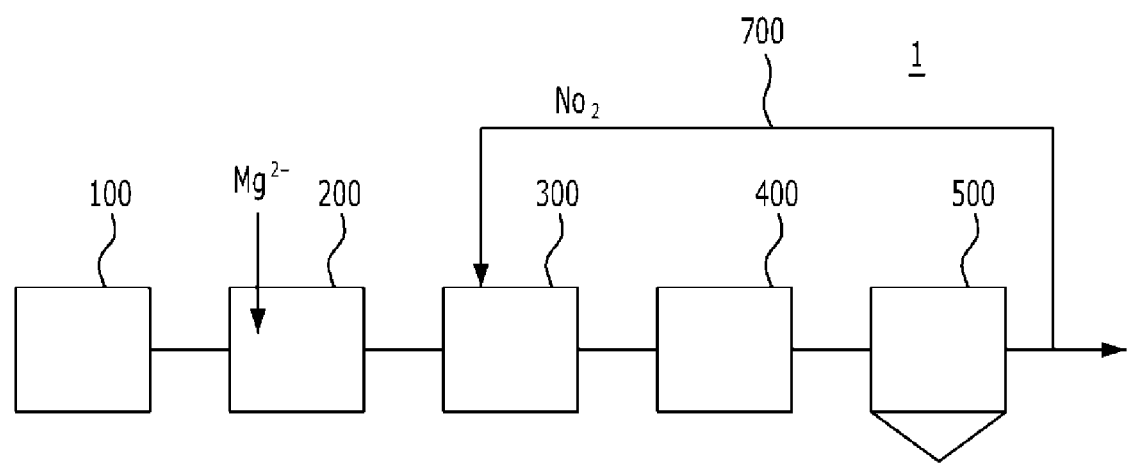
FIG. 6 is a schematic view of a water treatment apparatus according to an exemplary embodiment.

FIG. 6 is a schematic view illustrating a water treatment apparatus 1 according to an exemplary embodiment. Referring to FIG. 6, the water treatment apparatus 1 may further include a second return pipe 700 connected between the raw water discharge pipe and the anammox reactor 300 such that a portion of the raw water discharged from the sedimentation tank 500 can be returned to the anammox reactor 300 through the second return pipe 700 and nitrite ions ($NO_2^-$) contained in the raw water discharged from the sedimentation tank 500 can be removed in the anammox reactor 300.

The ammonium ions ($NH_4^+$) and the nitrite ions ($NO_2^-$) contained in the raw water discharged from the sedimentation tank 500 can be almost completely removed through the anammox process and the partial nitritation process. However, untreated nitrite ions ($NO_2^-$) may remain due to differences in an activity of microorganisms and in a content of ammonium ions ($NH_4^+$) and nitrite ions ($NO_2^-$). Therefore, if the raw water discharged from the sedimentation tank 500 is returned to the anammox reactor 300 through the second return pipe 700, the nitrite ions ($NO_2^-$) contained in the raw water undergo anammox reaction with the ammonium ions ($NH_4^+$) so that the nitrite ions ($NO_2^-$) can be removed as nitrogen gas.

Figure 7:
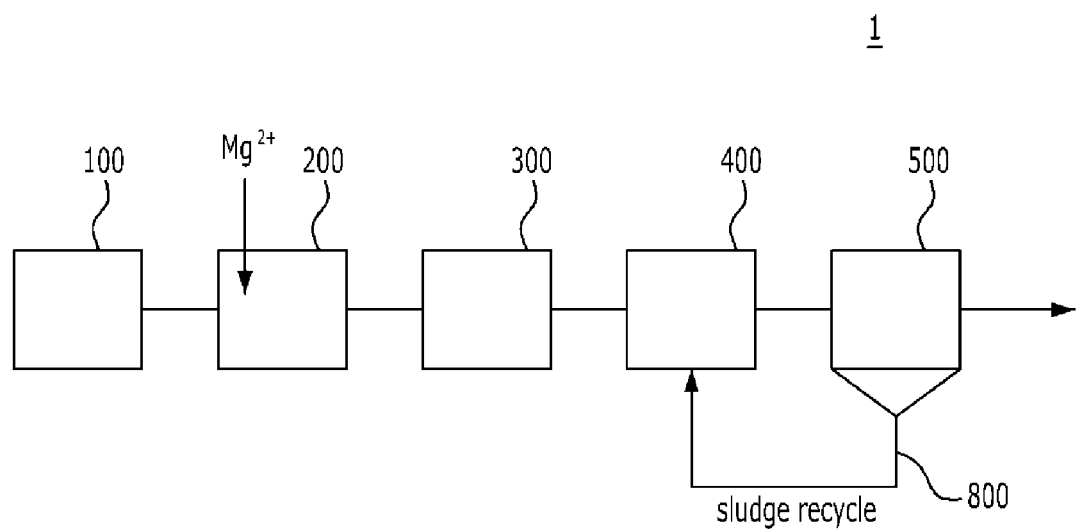
FIG. 7 is a schematic view of a water treatment apparatus according to an exemplary embodiment.

FIG. 7 is a schematic view illustrating the water treatment apparatus 1 according to an exemplary embodiment. Referring to FIG. 7, the water treatment apparatus 1 may further include a third return pipe 800 connected to a lower portion of the sedimentation tank 500 and the partial nitritation tank 400 so that a portion of the sludge discharged from the sedimentation tank 500 is returned to the partial nitritation tank 400 to recover the aerobic ammonium oxidizing bacteria (AOB) in the partial nitritation tank 400.

Figure 8:
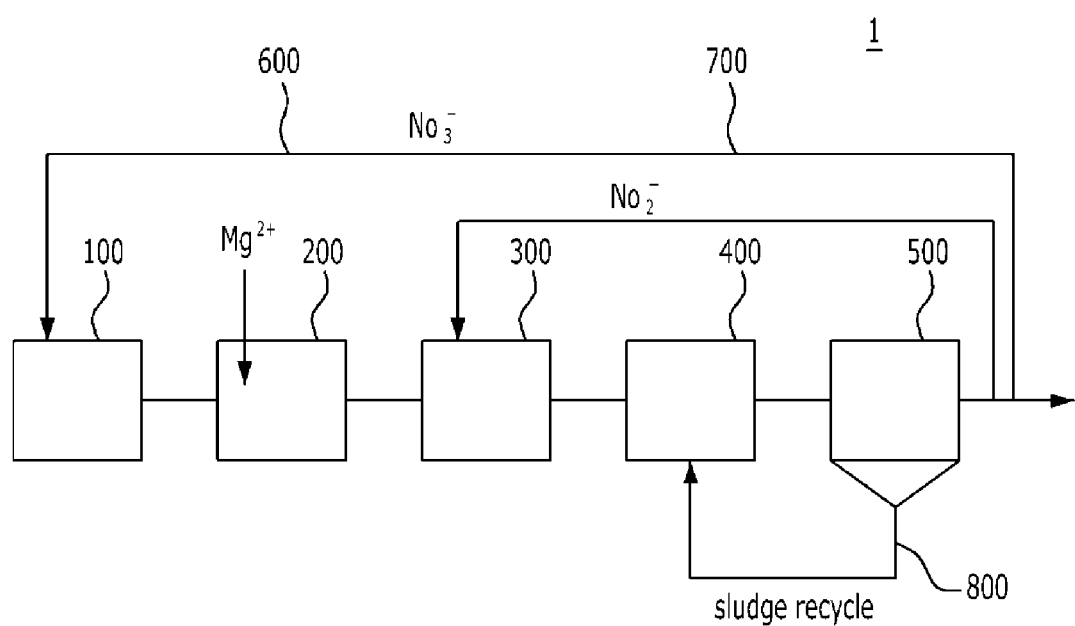
FIG. 8 is a schematic view of a water treatment apparatus according to an exemplary embodiment.

FIG. 8 is a schematic view illustrating the water treatment apparatus 1 according to an exemplary embodiment. Referring to FIG. 8, the water treatment apparatus 1 may include the first return pipe 600, the second return pipe 700, and the third return pipe 800.

For example, in the raw water discharged from the sedimentation tank 500, nitrate ions ($NO_3^-$) produced as by-products of the anammox process and nitrite ions ($NO_2^-$) not participating in the anammox process are contained. The nitrate ions ($NO_3^-$) and the nitrite ions ($NO_2^-$) may be returned to the denitrification reactor 100 and the anammox reactor 300 through the first return pipe 600 and through the second return pipe 700, respectively. Therefore, the nitrate ions ($NO_3^-$) and the nitrite ions ($NO_2^-$) contained in the raw water discharged from the sedimentation tank 500 can be removed respectively in the denitrification reactor 100 and the anammox reactor 300. In addition, a portion of the sludge discharged from the sedimentation tank 500 may be returned to the partial nitritation tank 400 through the third return pipe 800 so that the ammonium oxidizing bacteria (AOB) can be recovered.

Next, a water treatment method using the water treatment apparatus 1 will be described. In describing the water treatment method, a redundant description will not be described.

A water treatment method according to an exemplary embodiment is performed using the water treatment apparatus 1 of FIG. 1. The water treatment method may include a first step of removing nitrogen contained in raw water, a second step of removing phosphorus (P) contained in the raw water, a third step of removing nitrogen contained in the raw water through anammox reaction, and a fourth step of converting ammonium ions ($NH_4^+$) remaining unreacted during the anammox reaction into nitrite ions ($NO_2^-$).

The first step of removing nitrogen contained in raw water is performed in an anoxic tank (i.e., the denitrification reactor 100). In the first step, nitrogen, organic matter, etc. contained in the raw water can be removed by reciprocating the membrane 110 immersed in the raw water. The raw water having undergone the denitrification in the first step flows to the phosphorus treatment tank 200.

The second step of removing phosphorus (P) contained in the raw water is performed in the phosphorus treatment tank 200. Although phosphorus can be removed by various known methods, according to the exemplary embodiment, phosphorus (P) contained in the raw water is preferably removed using magnesium ions. The raw water from which the phosphorus is removed in the second step moves to the anammox reactor 300.

The third step of removing nitrogen contained in the raw water is a process in which anammox reaction occurs in the anammox reactor 300. The ammonium ions ($NH_4^+$) contained in the raw water may react with the nitrite ions ($NO_2^-$). The nitrogen-depleted water produced by the third step moves to the partial nitritation tank 400.

The fourth step is a process of converting ammonium ions ($NH_4^+$) not participating in the anammox reaction into nitrite ions ($NO_2^-$). The raw water having passed through the partial nitritation tank 400 is retained in the sedimentation tank 500 so that solids can settle to produce sludge, and is then discharged through the raw water discharge pipe.

A water treatment method according to an exemplary embodiment is performed using the water treatment apparatus 1 of FIG. 5. The water treatment method may include a first step of removing nitrogen contained in raw water, a second step of removing phosphorus (P) contained in the raw water, a third step of removing nitrogen contained in the raw water through anammox reaction, a fourth step of converting ammonium ions ($NH_4^+$) remaining unreacted during the anammox reaction into nitrite ions ($NO_2^-$), and a fifth step of removing nitrate ions ($NO_3^-$) by returning a portion of the raw water passing through the fourth step to the first step.

The first through fourth steps of the water treatment method according to the present exemplary embodiment are the same as the first through fourth steps of the water treatment method according to the foregoing exemplary embodiment, respectively. The water treatment method according to the present exemplary embodiment may further include the fifth step in which a portion of the raw water passing through the fourth step is returned to the denitrification reactor 100 through the first return pipe 600 so that the nitrate ions ($NO_3^-$) can be removed. The ammonium ions ($NH_4^+$) contained in the raw water discharged from the sedimentation tank 500 are almost completely removed through the anammox process and the partial nitritation process. However, because nitrate ions ($NO_3^-$) are generated as by-products of the anammox process, it is necessary to remove the nitrate ions ($NO_3^-$). The nitrate ions ($NO_3^-$) contained in the raw water discharged from the sedimentation tank 500 can be removed by returning the raw water discharged from the sedimentation tank 500 to the denitrification reactor 100 through the first return pipe 600.

A water treatment method according to an exemplary embodiment is performed using the water treatment apparatus 1 of FIG. 6. The water treatment method may include a first step of removing nitrogen contained in raw water, a second step of removing phosphorus (P) contained in the raw water, a third step of removing nitrogen contained in the raw water through anammox reaction, a fourth step of converting ammonium ions ($NH_4^+$) remaining unreacted during the anammox reaction into nitrite ions ($NO_2^-$), and a sixth step of removing nitrite ions ($NO_2^-$) by returning a portion of the raw water passing through the fourth step to the third step.

The first through fourth steps of the water treatment method according to the present exemplary embodiment are the same as the first through fourth steps of the water treatment method according to the foregoing exemplary embodiment, respectively. The water treatment method according to the present exemplary embodiment may further include the sixth step in which a portion of the raw water passing through the fourth step is returned to the anammox reactor 300 through the second return pipe 700 so that the nitrite ions ($NO_2^-$) can be removed. The ammonium ions ($NH_4^+$) and the nitrite ions ($NO_2^-$) contained in the raw water discharged from the sedimentation tank 500 can be almost completely removed through the anammox process and the partial nitritation process. However, unreacted nitrite ions ($NO_2^-$) are likely to exist due to a difference in an activity of microorganisms and a difference between a concentration of ammonium ions ($NH_4^+$) and a concentration of nitrite ions ($NO_2^-$). Therefore, to solve this problem, the raw water discharged from the sedimentation tank 500 is returned to the anammox reactor 300 through the second return pipe 700 so that the nitrite ions and the ammonium ions undergo the anammox reaction to remove the nitrite ions as nitrogen gas.

A water treatment method according to an exemplary embodiment is a water treatment method using the water treatment apparatus 1 of FIG. 7. The water treatment method may include a first step of removing nitrogen contained in raw water, a second step of removing phosphorus (P) contained in the raw water, a third step of removing nitrogen contained in the raw water through anammox reaction, a fourth step of converting ammonium ions ($NH_4^+$) remaining unreacted during the anammox reaction into nitrite ions ($NO_2^-$), and a seventh step of returning a portion of sludge generated in the fourth step to the partial nitritation tank 400.

The first through fourth steps of the method according to the present exemplary embodiment are the same as the first through fourth steps of the method according to the forgoing exemplary embodiment, respectively. The water treatment method according to the present exemplary embodiment may further include the seventh step in which a portion of the sludge generated in the fourth step is returned to the partial nitritation tank 400 so that the aerobic ammonium oxidizing bacteria (AOB) can be recovered.

A water treatment method according to an exemplary embodiment is a water treatment method using the water treatment apparatus 1 of FIG. 8. The water treatment method may further include the fifth step, the sixth step, and the seventh step in addition to the first through fourth steps. That is, a portion of the raw water discharged from the sedimentation tank 500 is returned to the denitrification reactor 100 and the anammox reactor 300 through the first return pipe 600 and the second return pipe 700, respectively so that the nitrate ions ($NO_3^-$) and the nitrite ions ($NO_2^-$) can be removed. In addition, the sludge is returned to the partial nitritation tank 400 so that the AOB can be recovered.

Figure 9:
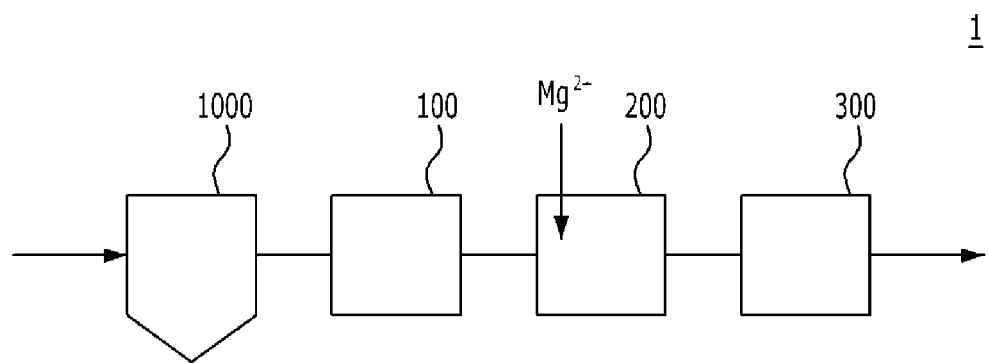
FIG. 9 is a schematic view of a water treatment apparatus according to another exemplary embodiment.

FIG. 9 is a schematic view illustrating a water treatment apparatus 1 according to another exemplary embodiment. Referring to FIG. 9, a water treatment apparatus 1 may include a suspended-solids contact reactor 1000 for removing suspended solids (SS) and soluble COD contained in raw water, a denitrification reactor 100 located downstream of the suspended-solids contact reactor 1000 and configured to remove nitrogen contained in the raw water, a phosphorus treatment tank 200 located downstream of the denitrification reactor 100 and configured to remove phosphorus (P) contained in the raw water, and an anammox reactor 300 located downstream of the phosphorus treatment tank 200 and configured to remove nitrogen contained in the raw water.

With this water treatment apparatus 1, it is possible to pre-remove organic matter, phosphorous, etc. at an upstream stage of an anammox process, thereby stably performing the anammox process and improving nitrogen removal efficiency.

Figure 10:
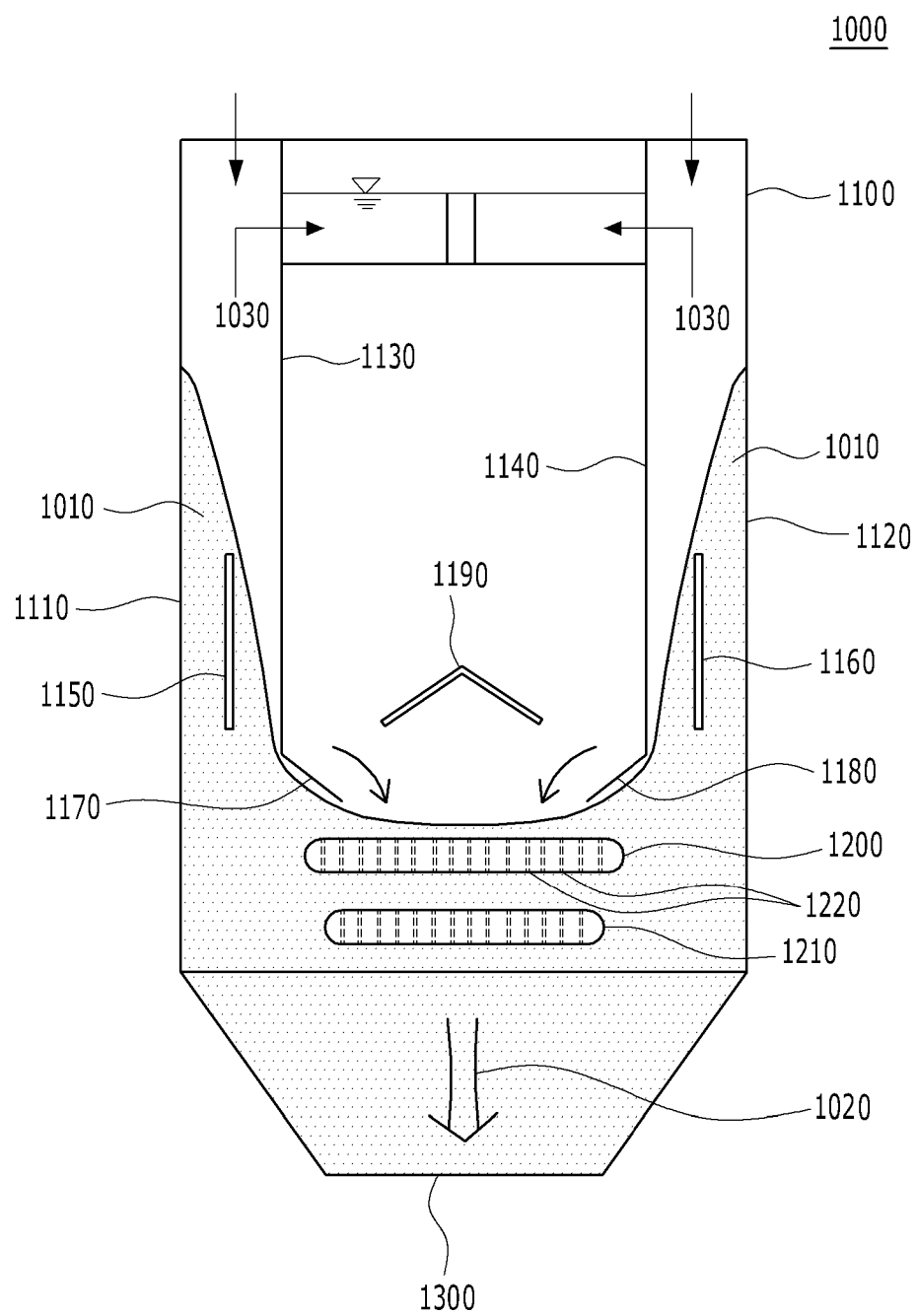
FIG. 10 is a schematic view illustrating a suspended-solids contact reactor used in the exemplary embodiment.

FIG. 10 is a schematic view illustrating the suspended-solids contact reactor 100. Referring to FIG. 10, the suspended-solids contact reactor 1000 which is a reactor for removing suspended solids (SS) and soluble COD contained in raw water may include a hopper 1100 through which the raw water is supplied, orifice tubes 1200 and 1210 that are disposed in a lower portion of the hopper 1100 and are provided with multiple orifices (i.e., holes) 1220 through which flocks 1010 contained in the raw water pass so as to settle to a bottom of the suspended-solids contact reactor 1000 so that sludge forms on the bottom, and a sludge discharge port 1300 through which the sludge is discharged to the outside.

The hopper 1100 which receives and contains raw water may be a vessel with a circular or rectangular transverse cross section and a conical vertical cross section. However, the shape of the hopper 1100 is not limited thereto. Baffles 1130 and 1140 are disposed to be spaced from an inner surface 1110 and 1120 of the hopper 1100 by a predetermined distance. If the raw water containing flocks 1010 is supplied to a gap between the inner surface 1110 of the hopper 1100 and the baffle 1130 and a gap between the inner surface 1120 of the hopper 1100 and the baffle 1140, the raw water containing the flocks 1010 moves downward due to the gravity. At this time, the baffles 1130 and 1140 prevent the flocs 1010 from moving toward an upper end or a center of the hopper 1100, and the flow of the raw water containing the flocks 1010 stably moves along the inner surface 1110 and 1120 of the hopper 1100 toward the bottom of the hopper 1100. In this way, the flocks 1010 are removed, and the flocks-depleted raw water 1030 is discharged from the upper end of the hopper 1100.

In addition, guide plates 1150 and 1160 are respectively provided between the inner surface 1110 and 1120 of the hopper 1100 and the baffles 1130 and 1140. By dividing the flow of the raw water containing flocks 1010, it is possible to prevent the sludge from rising. While the number of the guide plates 1150 and 1160 is not particularly limited, but it is preferably one, two, or three.

Further, inclined plates 1170 and 1180 are provided at lower ends of the baffles 1130 and 1140, respectively, thereby preventing the flocks 1010 or sludge from rising to the upper end of the hopper 1100 and directing the flocks 1010 or sludge toward the orifice tubes 1200 and 1210. The inclined plates 1170 and 1180 extend diagonally downward and inward in the hopper 1100.

Circular orifice tubes 1200 and 1210 which are provided in a lower portion of the hopper 1100 have one or more orifices (i.e., holes) 1220. When the flocks 1010 guided downward along the inner surface 1110 and 1120 of the hopper 1100 reach the circular orifice tubes 1200 and 1210, the flocks 1010 pass through the orifices 1220 at a high speed and are deposited on the bottom of the hopper 1100 to form sludge. The sludge is discharged through the sludge discharge port 1300 provided at the lower end of the hopper 1100.

A flow rate of the raw water, which is an amount of the raw water flowing through a certain area for a predetermined period of time, can be expressed as the product of a cross-sectional area of a pipe and a velocity of the flow of the raw water. When the flocks 1010 pass through the multiple orifices 1220 formed in the circular orifice tubes 1200 and 1210, the flow rate is constant over time. However, because the cross-sectional area of each of the orifices 1220 is decreased toward the lower end from the upper end, the velocity of the flow of the flocs flowing through the orifices 1220 is dramatically increased. Thus, the flocks 1010 pass through the orifices 1220 at a high speed and rapidly settle to the bottom so that sludge easily forms. The sludge is then removed.

Figure 11:
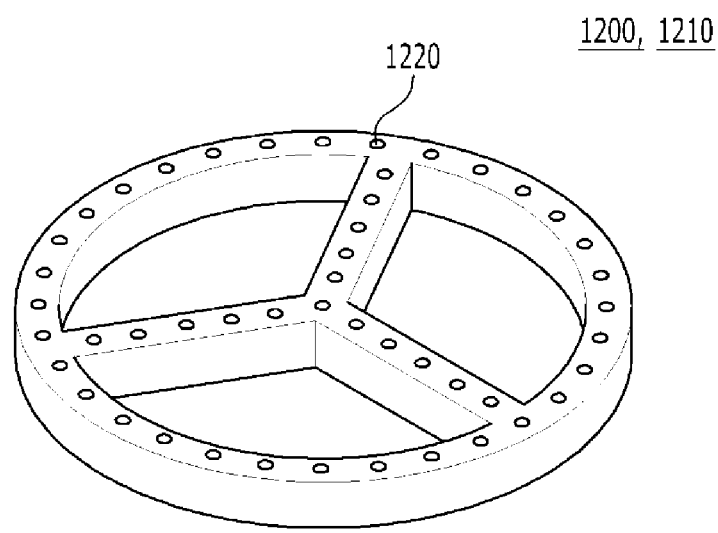
FIGS. 11 and 12 are schematic views illustrating an orifice tube used in the exemplary embodiment.
Figure 12:
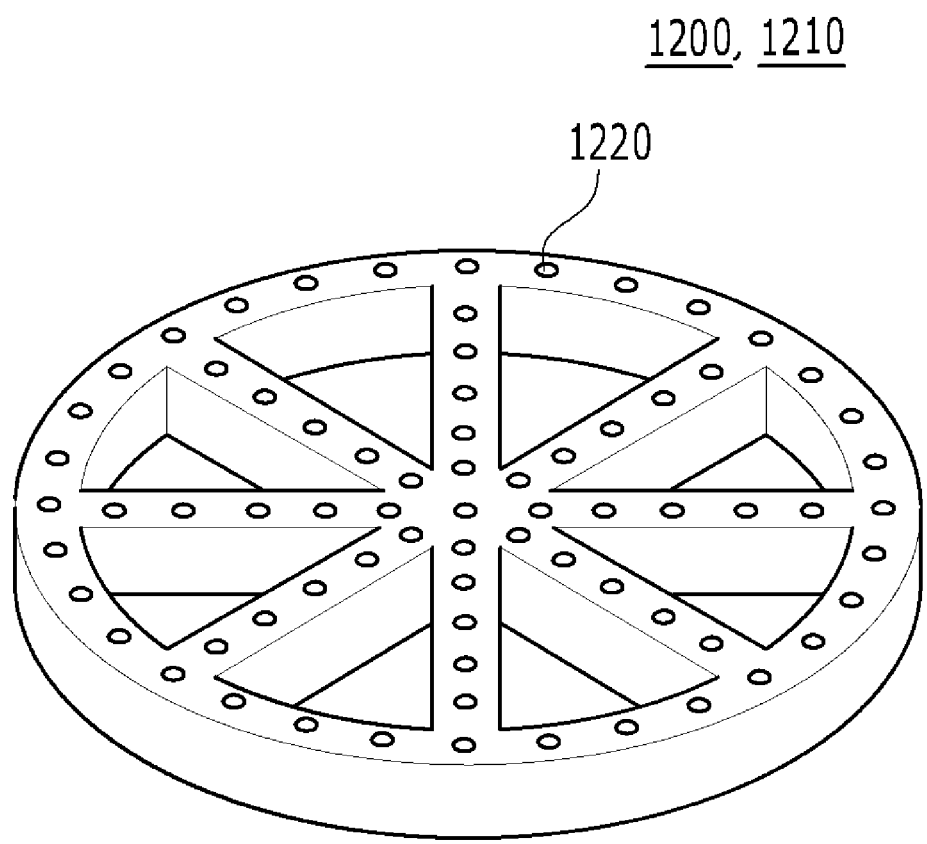

FIGS. 11 and 12 are schematic views illustrating the orifice tubes 1200 and 1210 according to an exemplary embodiment. The number of orifice tubes is not particularly limited, and is appropriately selected according to a scale of the hopper 1100 or an amount of raw water to undergo sedimentation. For example, the number of the orifice tubes is preferably two or three.

If the multiple circular orifice tubes 1200 and 1210 are used, a diameter of each of the orifice tubes 1200 and 1210 may be the same or different. For example, the multiple circular orifice tubes 1200 and 1210 are arranged such that the diameter of an upper orifice tube is larger than the diameter of a lower orifice tube. With this arrangement, it is possible to increase a sludge production rate (i.e., sedimentation speed). Here, the term "diameter" of the circular orifice tubes 1200 and 1210 means a length of a chord passing through a center point of the circular cross section of the orifice tubes 1200 and 1210 having a donut shape or a tube shape.

Each of the orifice tubes 1200 and 1210 may include one or more branch tubes. For example, as shown in FIG. 11, the branch tubes may be arranged to trisect the interior of each circular orifice tube 1200 and 1210, or as shown in FIG. 12, the branch tubes may be arranged in a radially alternating manner within the circular orifice tube 1200 or 1210. However, it is understood that the arrangement is not limited thereto.

A folding plate 1190 is provided above the circular orifice tubes 1200 and 1210 to prevent the sludge from rising in the hopper 1100. The folding plate 1190 has an L-shaped cross-section.

The flocks 1010 pass through the orifice tubes 1200 and 1210 at high speed and settle to the bottom of the hopper 1100. The accumulated flocks 1010 are referred to the sludge. The sludge on the bottom of the hopper 1100 is then removed through the sludge discharge port 1300. A sludge discharge pump may be connected to the sludge discharge port 1300 to increase the sludge discharge speed.

Figure 13:
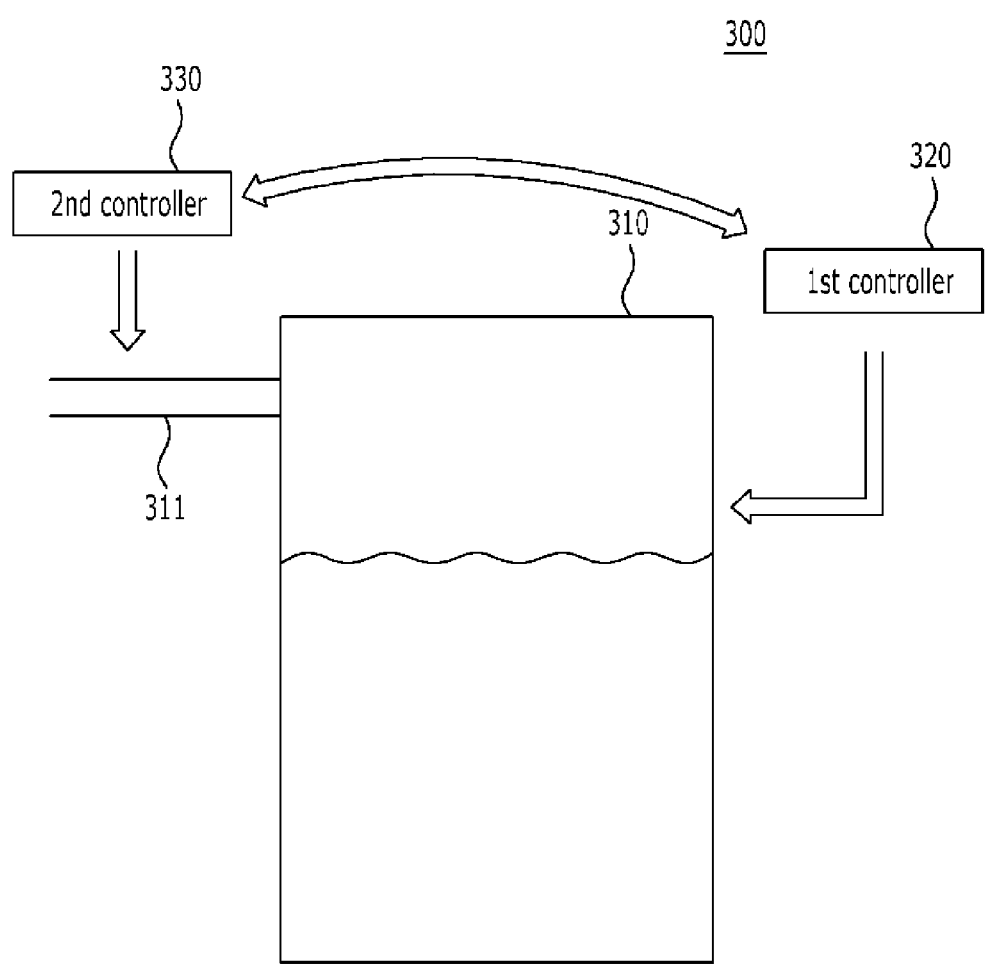
FIG. 13 is a schematic view illustrating an anammox reactor according to an exemplary embodiment.
Figure 14:
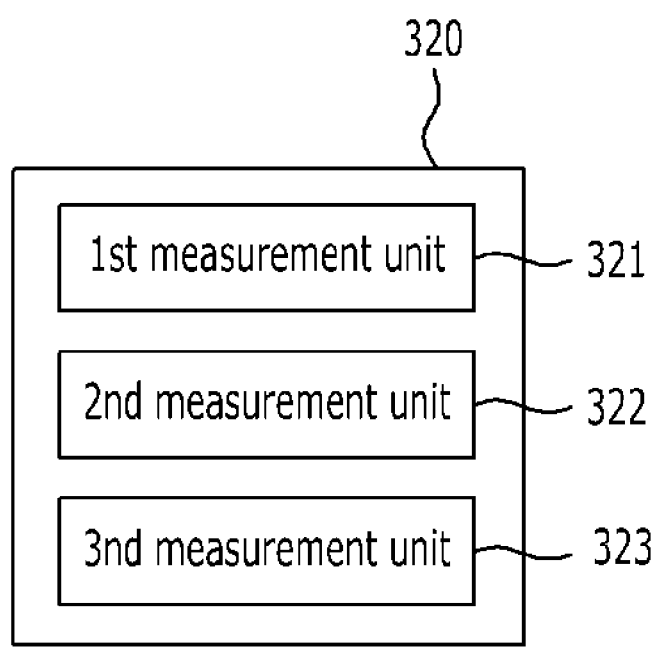
FIG. 14 is a schematic view illustrating a first controller according to an exemplary embodiment.

FIG. 13 is a schematic view illustrating an anammox reactor 300 according to an exemplary embodiment, and FIG. 14 is a schematic view illustrating a first controller according to an exemplary embodiment. Referring to FIGS. 13 and 14, the anammox reactor 300 may include a chamber 310 which is equipped with a raw water feed pipe 311 through which raw water is supplied and accommodates ammonium oxidizing bacteria (AOB) and anammox bacteria, a first controller 320 for measuring a concentration of nitrogen compounds contained in the raw water supplied to and stored in the chamber 310, and a second controller 330 for controlling a feed flow rate of the raw water so that a concentration of ammonium ions ($NH_4^+$) contained in the raw water supplied to and stored in the chamber 310 is maintained within a predetermined range.

The chamber 310 receives raw water through the raw water feed pipe 311 provided at one end thereof and accommodates ammonium oxidizing bacteria (AOB) and anammox bacteria therein. In this case, the partial nitritation tank 400 shown in FIG. 1 may be omitted and the process may be operated using the water treatment apparatus 1 of FIG. 9.

The shape of the chamber 310 is not particularly limited but can be diversely designed according to the structure of the water treatment apparatus. For example, it may be a cylindrical shape or a square columnar shape. The aerobic ammonium oxidizing bacteria (AOB) contained in the chamber 310 may be *Nitrosomonas* or *Nitrosococcus*. The anammox bacteria may be one or more species selected from the group consisting of *Candidatus kuenenia*, *Candidatus brocadia*, *Candidatus anammoxoglobus*, *Candidatus jettenia*, and *Candidatus scalindua*.

The first controller 320 measures the concentration of nitrogen compounds contained in the raw water supplied to and stored in the chamber 310. The nitrogen compounds include ammonium ions ($NH_4^+$), nitrite ions ($NO_2^-$), nitrate ions ($NO_3^-$), and various salt forms thereof. The concentration of the nitrogen compounds can be measured using various sensors known in the art.

Referring to FIG. 14, the first controller 320 may include a first measuring unit 321 for measuring the concentration of ammonium ions ($NH_4^+$), a second measuring unit 322 for measuring the concentration of nitrite ions ($NO_2^-$), and a third measuring unit 323 for measuring the concentration of nitrate ions ($NO_3^-$). The first measuring unit 321 may include a first calculator for calculating an amount of reduced ammonium ions ($NH_4^+$) per unit time from a change in the concentration of ammonium ions ($NH_4^+$) measured, the second measuring unit 322 may include a second calculator for calculating an amount of produced nitrite ions ($NO_2^-$) per unit time from a change in the concentration of nitrite ions ($NO_2^-$) measured, and the third measuring unit 323 may include a third calculator for calculating an amount of produced nitrate ions ($NO_3^-$) per unit time from a change in the concentration of nitrate ions ($NO_3^-$) measured.

When aerobic ammonium oxidizing bacteria and anammox bacteria are mixed in one reactor, it is important to appropriately control activities of the two types of bacteria (microorganisms). In related art anammox reactors, because process conditions are controlled by adjusting only a ratio of the amount of produced nitrite ions ($NO_2^-$) to the amount of reduced ammonium ions ($NH_4+$), nitrogen removal efficiency is low.

To solve this problem, the first controller 320 measures a change in the concentration of nitrogen compounds including nitrite ions ($NO_2^-$) by using the first measuring unit 321, the second measuring unit 322, and the third measuring unit 323, and the second controller 330 adaptively controls the feed flow rate of the raw water introduced into the chamber 310 according to the concentration of the nitrogen compounds, thereby improving the nitrogen removal efficiency.

The second controller 330 exchanges data with the first controller 320 and adaptively controls the feed flow rate of the raw water on the basis of the concentration of nitrogen compounds measured by the first controller 320.

Because the activities of the ammonium oxidizing bacteria (AOB) and the anammox bacteria cannot always be maintained uniformly in the anammox reactor 300, a case occurs in which the ratio of the amount of reduced ammonium ions ($NH_4^+$) and the amount of produced nitrite ions ($NO_2^-$) is not 1:1.

If the ammonium oxidizing bacteria (AOB) is more active than the anammox bacteria in the chamber 310, the AOB converts the ammonium ions ($NH_4^+$) into the nitrite ions ($NO_2^-$), and the anammox bacteria causes a reaction between the ammonium ions ($NH_4^+$) and the nitrite ions ($NO_2^-$) to generate nitrogen gas which is released to the air. Therefore, the nitrite ions ($NO_2^-$) rarely accumulate in the chamber 310. In this case, operation conditions need to be controlled such that the amount of ammonium ions ($NH_4^+$) is increased. Thus, the second controller 330 increases the feed flow rate of the raw water by controlling a pump, a valve, etc. connected to the raw water feed pipe 311.

If the process control is performed in such a manner that the concentration of ammonium ions ($NH_4^+$) in the chamber 310 is increased, because the activity of the nitrite oxidizing bacteria (NOB) is inhibited due to an increase in the concentration of free ammonia and a high alkalinity, the efficiency of the operation process is improved and the nitrogen removal effect is enhanced.

The second controller 330 controls the feed flow rate of the raw water according to a value calculated by Expression 1 below.

$$Q = \frac{[NO_{2gen}^-] + [NO_{3gen}^-]}{[NH_{4rem}^+]} \qquad \text{[Expression 1]}$$

That is, if the value calculated by Expression 1 is 0.7 or greater, the feed flow rate of the raw water is controlled such that the concentration of ammonium ions ($NH_4^+$) in the chamber 310 is maintained within a range of 50 to 100 mg/L, while if the value calculated by Expression 1 is less than 0.7, the feed flow rate of the raw water is controlled such that the concentration of ammonium ions ($NH_4^+$) in the chamber 310 is maintained within a range of 100 to 250 mg/L. These reference values are obtained from numerous experiments and can be applied to water treatment plants that treat wastewater with a concentration of ammonium ions ($NH_4^+$) in a range of 600 to 1,000 ppm.

The anammox reactor 300 may further include a return pipe for returning a portion of the raw water discharged from the anammox reactor 300 to the denitrification reactor 100. In this case, because a portion of the raw water is returned to the denitrification rector 100 through the return pipe, it is possible to remove the nitrate ions ($NO_3^-$) which are byproducts of the anammox reaction, thereby improving nitrogen removal efficiency.

Next, a water treatment method of treating raw water using the water treatment apparatus 1 of FIGS. 9 and 13 will be described.

The water treatment method may include a first step of removing suspended solids (SS) and soluble COD contained in incoming raw water, a second step of removing nitrogen contained in the raw water, a third step of removing phosphorus (P) contained in the raw water, and a fourth step of removing nitrogen contained in the raw water through anammox reaction. The water treatment method according to the exemplary embodiment pre-removes organic matter, phosphorous, etc. at an upstream stage of the anammox process, thereby stably maintaining the anammox process and improving nitrogen removal efficiency.

The first step is a process of removing suspended solids (SS) and soluble COD and is performed in the suspended-solids contact reactor 1000. The second step is a process of primarily removing nitrogen through denitrification, and nitrogen contained in the raw water is removed by linearly reciprocating the membrane 110 by using the reciprocating device 120. The third step is a process of removing phosphorous (P) contained in the raw water, and various known method can be used. For example, the phosphorous (P) is removed by adding magnesium ions to the raw water. The fourth step is a process of secondarily removing nitrogen through anammox reaction, and it is possible to improve nitrogen removal efficiency by adaptively adjusting the concentration of ammonium ions contained in the raw water according to the concentration of each of the nitrogen compounds. After the fourth step, a fifth step of returning a portion the raw water discharged from the anammox reactor 300 to the denitrification reactor 100 may be performed. The anammox reaction produces nitrate ions ($NO_3^-$) as the by-products. However, the nitrate ions ($NO_3^-$) can be effectively removed in the denitrification reactor 100 by returning the raw water discharged from the anammox reactor 300 to the denitrification reactor 100.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A water treatment apparatus comprising:
   a denitrification reactor configured to remove nitrogen contained in raw water supplied thereto;
   a phosphorus treatment tank configured to remove phosphorus (P) contained in the raw water supplied from the denitrification reactor;
   an anammox reactor configured to remove nitrogen contained in the raw water supplied from the phosphorous treatment tank through an anammox reaction;
   a partial nitrification tank configured to convert ammonium ions ($NH_4^+$) remaining unreacted in the anammox reactor into nitrite ions ($NO_2^-$); and
   a sedimentation tank configured to cause settling of suspended matter contained in the raw water supplied from the partial nitritation tank so that sludge forms and discharge the raw water through a raw water discharge pipe.

2. The apparatus according to claim 1, wherein the denitrification reactor comprises a membrane immersed in the raw water and a reciprocating device connected to the membrane to reciprocate the membrane.

3. The apparatus according to claim 1, wherein the phosphorus treatment tank removes the phosphorus contained in the raw water by using magnesium ions.

4. The apparatus according to claim 1, wherein the anammox reactor accommodates anammox bacteria including any one or more species selected a group consisting of *Candidatus kuenenia*, *Candidatus brocadia*, *Candidatus anammoxoglobus*, *Candidatus jettenia*, and *Candidatus scalindua*.

5. The apparatus according to claim 1, wherein the partial nitritation tank accommodates aerobic ammonium oxidation bacteria (AOB) therein.

6. The apparatus according to claim 1, further comprising a first return pipe connected between the raw water discharge pipe and the denitrification reactor, wherein a portion of the raw water discharged from the sedimentation tank is returned to the denitrification reactor through the first return pipe to remove nitrate ions ($NO_3^-$).

7. The apparatus according to claim 1, further comprising a second return pipe connected between the raw water discharge pipe and the anammox reactor, wherein a portion of the raw water discharged from the sedimentation tank is returned to the anammox reactor through the second return pipe to remove nitrite ions ($NO_2^-$).

8. The apparatus according to claim 1, further comprising a third return pipe connected between the sedimentation tank and the partial nitritation tank, wherein a portion of the sludge discharged from the sedimentation tank is transported to the partial nitritation tank through the third return pipe.

9. The apparatus according to claim 1, further comprising a suspended-solids contact reactor configured to remove suspended solids (SS) and soluble COD contained in the raw water, the suspended-solids contact reactor being located an upstream of the denitrification reactor.

10. The apparatus according to claim 9, wherein the suspended-solids reactor comprises:
    a baffle configured to be spaced apart from an inner surface of a hopper by a predetermined distance and guide a flow of flocks contained in the raw water toward a lower end of the hopper;
    a guide plate located between the inner surface of the hopper and the baffle to divide the flow of the flocks to prevent the sludge from rising; and
    a folding plate located above an orifice tube to prevent the sludge from rising in the hopper.

11. The apparatus according to claim 1, wherein the anammox reactor comprises:
    a chamber configured to be equipped with a raw water feed pipe through which the raw water is supplied and accommodate ammonia oxidizing bacteria (AOB) and anammox bacteria;
    a first controller configured to measure a concentration of a nitrogen compound contained in the raw water supplied to and stored in the chamber; and
    a second controller configured to control a feed flow rate of the raw water so that a concentration of ammonium ions ($NH_4^+$) contained in the raw water supplied to and stored in the chamber is maintained within a predetermined range.

12. The apparatus according to claim 11, wherein the first controller comprises a first measuring unit configured to measure the concentration of ammonium ions ($NH_4^+$), a second measuring unit configured to measure a concentration of nitrite ions ($NO_2^-$), and a third measuring unit configured to measure a concentration of nitrate ions ($NO_3^-$).

13. The apparatus according to claim 12, wherein the first measuring unit comprises a first calculator configured to calculate an amount of reduced ammonium ions ($NH_4^+$) by measuring a change in the concentration of the ammonium ions ($NH_4^+$) for a unit time, the second measuring unit comprises a second calculator configured to calculate an amount of produced nitrite ions ($NO_2^-$) by measuring a change in the concentration of nitrite ions ($NO_2^-$) for the unit time, and the third measuring unit comprises a third calculator configured to calculate an amount of produced nitrate ions ($NO_3^-$) by measuring a change in the concentration of nitrate ions ($NO_3^-$) for the unit time.

14. The apparatus according to claim 11, wherein the second controller controls the feed flow rate of the raw water according to a value calculated by Expression 1, $$Q = \frac{[NO_{2gen}^-] + [NO_{3gen}^-]}{[NH_{4rem}^+]} \quad \text{[Expression 1]}$$

wherein if the value is 0.7 or greater, the feed flow rate of the raw water is controlled such that the concentration of ammonium ions ($NH_4^+$) in the chamber is maintained within a range from 50 to 100 mg/L, and if the value is less than 0.7, the feed flow rate of the raw water is controlled such that the concentration of ammonium ions ($NH_4^+$) in the chamber is maintained within a range from 100 to 250 mg/L.

15. A water treatment method using a water treatment apparatus, the method comprising:
   removing, by a denitrification reactor, nitrogen contained in raw water supplied;
   removing, by a phosphorus treatment tank, phosphorus (P) contained in the raw water supplied from the denitrification reactor;
   removing, by an anammox reactor, nitrogen contained in the raw water supplied from the phosphorus treatment tank through an anammox reaction;
   converting, by a partial nitritation tank, ammonium ions ($NH_4^+$) remaining unreacted during the anammox reaction into nitrite ions ($NO_2^-$); and
   settling, by a sedimentation tank, suspended matter contained in the raw water supplied from the partial nitritation tank to form sludge and discharging the raw water.

16. The method according to claim 15, further comprising:
   returning a portion of the raw water discharged from the sedimentation tank to the denitrification reactor to remove nitrate ions ($NO_3^-$).

17. The method according to claim 15, further comprising:
   returning a portion of the raw water discharged from the sedimentation tank to the anammox reactor to remove nitrite ions ($NO_2^-$).

18. The method according to claim 15, further comprising:
   transporting a portion of the sludge discharged from the sedimentation tank to the partial nitritation tank.

19. The method according to claim 15, further comprising:
   removing, by a suspended-solids contact reactor, suspended solids (SS) and soluble COD contained in the raw water prior to the removing nitrogen contained in raw water.

* * * * *